United States Patent Office 3,048,122
Patented Aug. 7, 1962

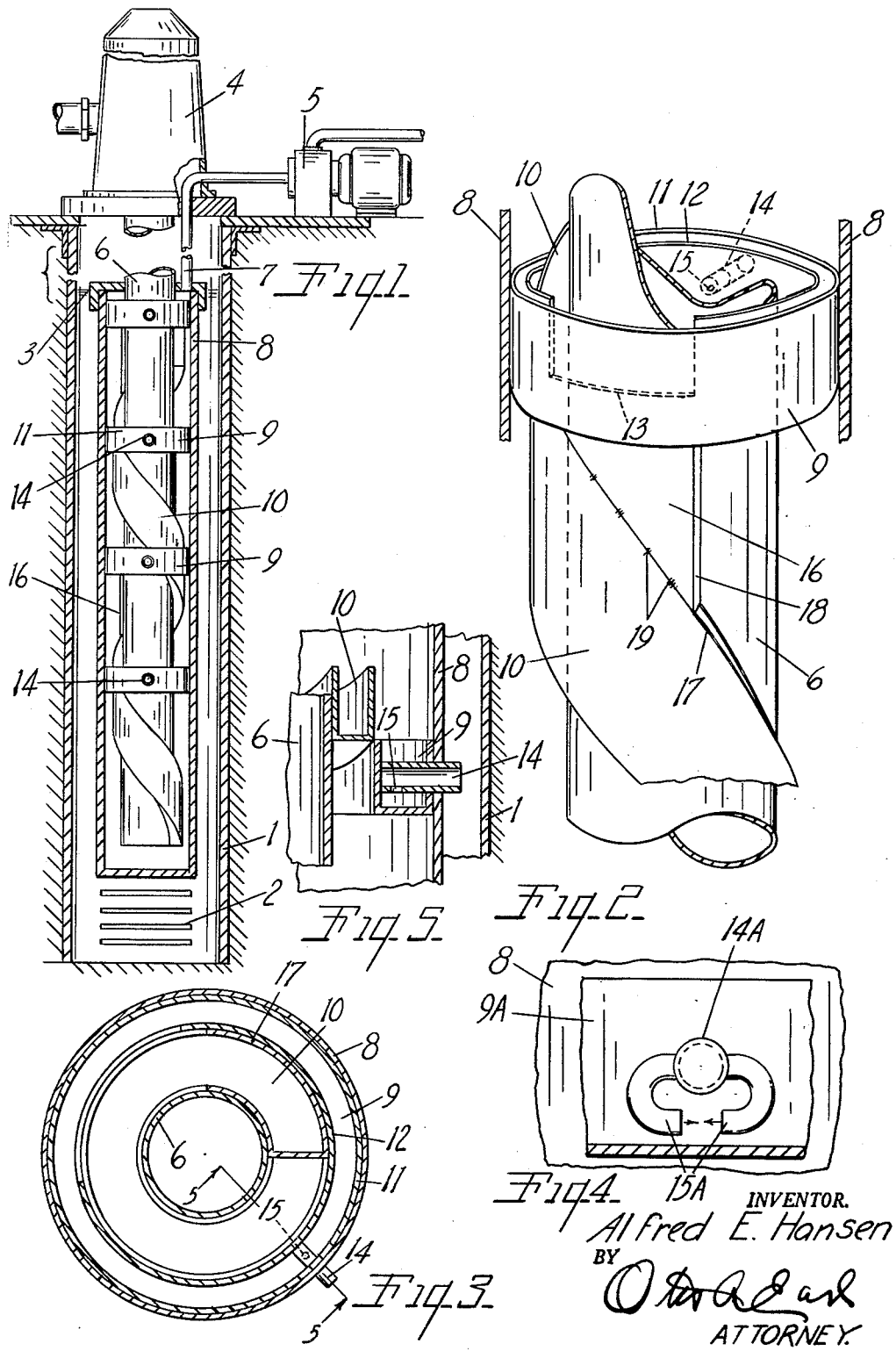

3,048,122
GAS SEPARATORS FOR WELLS
Alfred E. Hansen, Michigan Theatre Bldg.,
Muskegon, Mich.
Filed Dec. 31, 1959, Ser. No. 863,266
10 Claims. (Cl. 103—203)

This invention relates to improvements in gas separators for wells. The principal objects of this invention are:

First, to provide apparatus for effectively separating the gas from a liquid in a well prior to pumping out the liquid and gas separately.

Second, to provide gas separating apparatus which functions as an incident to the entrance of liquid from the well to the intake of the pump.

Third, to provide gas separating apparatus which functions to separate gas from liquid without also inducing deposit of minerals dissolved in the liquid on the parts of the separating apparatus which it contacts.

Fourth, to provide gas separating apparatus for a well which directs the flow of the liquid in smooth non-splashing motion during separation of the gas from the liquid so as not to induce the separation of minerals dissolved in the liquid and their deposit on the surfaces of the apparatus in the well.

Other objects and advantages of the invention will be apparent from a consideration of the following descriptions and claims, the drawings of which there is one sheet illustrating a highly practical form of the gas separating apparatus of the invention and one modified form of liquid introducing element for the apparatus.

FIG. 1 is a fragmentary vertical cross sectional view through a well having the gas separating apparatus of the invention installed therein.

FIG. 2 is a fragmentary enlarged perspective view of the gas separating elements shown in FIG. 1.

FIG. 3 is a fragmentary transverse cross sectional view through one of the liquid intake and collector rings and the adjacent elements of the separating apparatus.

FIG. 4 is a fragmentary vertical cross sectional view through one of the collector rings of the apparatus illustrating a modified form of liquid inlet fixture for the separating apparatus.

FIG. 5 is a fragmentary vertical cross sectional view along the line 5—5 in FIG. 3.

The gas from liquid separating apparatus of the invention is particularly designed for use in relatively large volume water wells in which the well water contains a high percentage of an undesirable gas, however, the apparatus may be used in other wells such as oil wells and it is a feature of the apparatus that it prevents or minimizes the deposit of solid minerals from the liquid being pumped on the surfaces of the gas separating apparatus which deposits would soon build up and clog the separating apparatus and the pump intake, FIG. 1 illustrates a well bore having a conventional casing 1 with a screen or other inlet 2 in its bottom which permits liquid such as water from the surrounding earth strata to rise to the ground level indicated at 3. At the surface of the ground, the well is provided with a liquid pump 4 and a gas suction pump 5. The liquid pump functions in a conventional manner to withdraw liquid from the well through a pump column or tube 6 and the vacuum pump 5 draws off liberated gases through the gas suction pipe 7.

Inserted into the well casing 1 and projecting above and below the liquid level 3 is a tubular gas separator sleeve 8 which is closed at the bottom and at the top except for the entrance of the pump tube 6 and the connection of the gas suction pipe to the upper end of the sleeve. The pump column or tube 6 projects to adjacent the bottom of the separator sleeve where it collects liquid for delivery by the pump 4. The gas separating apparatus of the invention consists of a plurality of vertical spaced collector rings 9 secured around the inside of the separator sleeve and a spirally arranged delivery trough 10 mounted around the pump column within the collector rings and extending continuously from the upper collector ring to the lower end of the pump column.

With particular reference to FIGS. 2 and 3, it will be noted that the collector rings 9 are annular sheet metal rings of upwardly opening U-shaped cross section which provide outer walls 11 and inner walls 12. The inner walls 12 are cut away at one point to provide generally rectangular overflow openings or notches 13 and at diametrically opposite sides of the rings 9 from the overflow notches there is provided an inlet pipe 14 which is supported with its lower side below the level of the bottom edge of the overflow notch 13 by engagement with the inner and outer walls 11 and 12. The pipe projects through the outer wall 11 of the collecting ring 9 and also through the adjacent collector sleeve 8 to open into space within the well casing below the liquid level 3. Within the cross section of the collector ring the inlet pipe 14 is provided with a downwardly directed discharge opening 15 so that liquid entering the pipe 14 from the well bore s discharged downwardly against the bottom of the collector ring where it must necessarily impinge against the bottom of the collector ring and change direction. Since the opening or hole 15 is below the level of the notch 13 the hole will be submerged at all times and there will be little splash resulting from the delivery of liquid into the collector ring. The incoming liquid will rise or roll in a bubbling flow sometimes referred to as a boil and the reversal of direction of flow of the liquid at the boil liberates entrained gases in the liquid so that they rise upwardly in the separator sleeve 8 and are drawn off through the pipe 7 while the liquid flows in opposite circular paths around the collector ring to the overflow notch 13. It is pointed out that the convergence or re-uniting of the two streams of liquid approaching from opposite directions at the overflow notch also creates a boil or rising in the liquid streams which functions to liberate more gas.

As the liquid from which the gas has been liberated flows over the edge of the discharge notch 13 it is delivered directly into the open top of the spirally arranged delivery trough 10. In order to prevent or contain any splashing of the overflow liquid a generally triangular baffle 16 is fitted between the outer wall 17 of the delivery trough and the inner edge of the collector ring 9 below the notch 13. A laterally turned vertical flange 18 on the baffle extends radially from the surface of the pump column 6 and projects from the bottom of the collector ring to the upper edge of the spiral delivery tube. The baffle and its flange direct the overflow from the notch 13 directly into the trough 10 with a minimum of splash. The baffle 16 is conveniently formed as a sheet metal part welded to the upper edge of the trough 10 as at 19.

As is illustrated a plurality of the collector rings 9 and inlet pipes 14 are provided at spaced intervals along the lower end of the pump column 6. The size and inlet capacity of the inlet pipes 14 is such that their combined capacity will approximately fill the trough 10 below the lowermost collector ring and the delivery trough is extended downwardly desirably below the level of the liquid in the separator sleeve so that a smooth non-splashing flow of gas-free liquid is provided to the inlet of the pump column. By way of example, in an 8¾ inch collector sleeve provided with a 5½ inch pump column or tube the inlet pipe 14 may be of the order of ⅜ inch inside diameter and four collector rings 9 may be provided in the separator sleeve at about 12 inch spacings to provide full flow at lower end of the delivery trough 10. These dimensions will of course vary depending upon the static head or pressure at the inlet pipes 14 and depending upon the capacity of the pump 4 to withdraw the gas-free liquid from the bottom of the separator sleeve.

FIG. 4 illustrates a modified type of inlet pipe 14a for delivering the liquid and gas mixture to the collector ring 9a. This inlet pipe 14a is provided with oppositely curved delivery nozzles 15a which open in opposed relationship adjacent the bottom of the collector ring 9a so that the flow from the two nozzles impinges against itself rather than against the bottom of the collector troughs. The impingement of the two streams of liquid creates a type of gas liberating boil which is similar in action to that created by the downwardly directed opening 15 in the first form of the invention. Some gas is liberated immediately and the liquid again divides and flows in opposite directions around the collector ring to the delivery notch 13. With either form of the inlet pipe a rolling bubbling flow is created which liberates the gas from the liquid and at least two areas of such change of direction of the liquid are provided to effectively separate the gas from the liquid. At the same time the flow of the liquid is kept relatively smooth without splash or splutter into fine droplets which would subject the liquid to excessive exposure to the air and gas in the separator sleeve and cause dissolved minerals in the liquid to be deposited upon the surfaces of the gas separating apparatus. The apparatus therefore remains relatively clean and unobstructed for effective gas separation over long periods.

What is claimed as new is:

1. Gas separating apparatus for liquid wells comprising a sleeve closed at the bottom and having a pump column projecting thereinto to adjacent the bottom of the sleeve, a gas suction connection to the upper end of said sleeve, a plurality of annular collector rings of upwardly opening U-shaped cross section positioned around the inside of said sleeve at vertically spaced intervals and each having an overflow notch formed in its inner wall, a delivery trough of upwardly opening U-shaped cross section arranged spirally around said pump column and passing successively through said collector rings in angularly spaced relation to said notches where the trough passes through the top of the ring, delivery pipes extending into said collector rings in angularly displaced diametrically opposite positions to the notches therein and projecting through the outer walls of said rings and said sleeve to open into the well, said delivery pipes having outlet openings formed therein and opening downwardly in said collector rings and positioned below the level of the notch in its associated ring, and triangular baffle plates extending between the lower edges of said rings below said notches and the upper outer edge of said spiral trough with radially inwardly turned flanges extending across the trough to the pump column in general vertical alignment with the edge of the notch in the superimposed collector ring.

2. Gas separating apparatus for liquid wells comprising a sleeve closed at the bottom and having a pump column projecting thereinto, a gas outlet at the upper end of said sleeve, a plurality of annular collector rings of upwardly opening U-shaped cross section positioned around the inside of said sleeve at vertically spaced intervals and each having an overflow notch formed in its inner wall, a delivery trough of upwardly opening U-shaped cross section arranged spirally around said pump column and passing successively through said collector rings in angularly spaced relation to said notches where the trough passes through the top of the ring, delivery pipes extending into said collector rings in angularly displaced relation to the notches therein and projecting through the outer walls of said rings and said sleeve to open into the well, said delivery pipes having outlet openings opening downwardly in said collector rings and positioned below the level of the notch in the associated ring, and baffle plates extending between the lower edges of said rings below said notches and the upper outer edge of said spiral trough.

3. Gas separating apparatus for liquid wells comprising a sleeve closed at the bottom and having a pump column projecting thereinto, a gas outlet at the upper end of said sleeve, a plurality of annular collector rings of upwardly opening U-shaped cross section positioned around the inside of said sleeve at vertically spaced intervals and each having an overflow notch formed in its inner wall, a delivery trough of upwardly opening U-shaped cross section arranged spirally around said pump column and passing successively in close side by side crossing relation through said collector rings in angularly spaced relation to said notches where the trough passes through the top of the ring, delivery pipes extending into said collector rings in angularly displaced relation to the notches therein and projecting through the outer walls of said rings and said sleeve to open into the well, said delivery pipes having outlet openings opening in said collector rings below the liquid level developed by said overflow notches, and baffle plates extending between the lower edges of said rings below said notches and the upper outer edge of said spiral trough.

4. Gas separating apparatus for liquid wells comprising a sleeve closed at the bottom and having a pump column projecting thereinto, a gas outlet at the upper end of said sleeve, a plurality of annular collector rings of upwardly opening U-shaped cross section positioned around the inside of said sleeve at vertically spaced intervals and each having an overflow notch fromed in its inner wall, a delivery trough of upwardly opening U-shaped cross section arranged spirally around said pump column and passing successively in close side by side crossing relation through said collector rings in angularly spaced relation to said notches where the trough passes through the top of the ring, and delivery pipes extending into said collector rings in angularly displaced relation to the notches therein and projecting through the outer walls of said rings and said sleeve to open into the well, said delivery pipes having oppositely curved branches with opposed outlet openings formed therein and opening in said collector rings and positioned below the level of the notch in the associated ring.

5. Gas separating apparatus for liquid wells comprising a sleeve closed at the bottom and having a pump column projecting thereinto, a gas outlet at the upper end of said sleeve, a plurality of annular collector rings of upwardly opening U-shaped cross section positioned around the inside of said sleeve at vertically spaced intervals and each having an overflow notch formed in its inner wall, a delivery trough of upwardly opening U-shaped cross section arranged spirally around said pump column and passing successively in close side by side crossing relation through said collector rings in angularly spaced relation to said notches where the trough passes through the top of the ring, and means forming delivery openings into said collector rings in angularly displaced relation to the notches therein and extending through the outer walls of said rings and said sleeve to open into the well .

6. Gas separating apparatus for liquid wells comprising a sleeve closed at the bottom and having a pump column projecting thereinto from the top, a gas outlet at the upper end of said sleeve, delivery openings formed through said sleeve at vertically spaced positions therealong, a spiral collecting trough arranged around said column within said sleeve to receive liquid from said delivery openings, and means forming horizontally disposed annular collecting chambers in said sleeve and interposed between said delivery openings and said trough, said chambers and said trough being open at their upper sides to the interior of said sleeve, said chamber forming means having a portion of their radially inner walls disposed lower than adjacent portions thereof and positioned to overflow into said trough at points angularly displaced from said delivery openings in said sleeve, said chamber forming means having walls disposed in transverse spaced relation across the inner ends of said delivery openings to cause an abrupt change of direction of flow of liquid entering through said delivery openings below the levels of the overflows into said trough and to cause division of the flows from said delivery openings into separate currents that recombine in opposed meeting relation adjacent said overflows.

7. Gas separating apparatus for liquid wells comprising a sleeve closed at the bottom and having a pump column projecting thereinto from the top, a gas outlet at the upper end of said sleeve, delivery openings formed through said sleeve at vertically spaced positions therealong, a spiral collecting trough arranged around said column within said sleeve to receive liquid from said delivery openings, and means forming horizontally disposed annular collecting chambers in said sleeve and interposed between said delivery openings and said trough in close side by side crossing relation to said trough, said chambers being open at their upper sides to the interior of said sleeve, said chamber forming means having a portion of their radially inner walls disposed lower than adjacent portions thereof and positioned to overflow into said trough at points angularly displaced from said delivery openings in said sleeve, said chamber forming means having walls disposed in transverse spaced relation across the inner ends of said delivery openings and below the level of the lower overflow portions of the chambers to cause an abrupt change of direction of flow of liquid entering through said delivery openings and to cause division of the flows from said delivery openings into separate currents that recombine in opposed meeting relation adjacent said overflows.

8. Gas separating apparatus for liquid wells comprising a sleeve closed at the bottom and having a pump column projecting thereinto from the top, a gas outlet at the upper end of said sleeve, delivery openings formed through said sleeve at vertically spaced positions therealong, a spiral collecting trough arranged around said column within said sleeve to receive liquid from said delivery openings, and means forming horizontally disposed annular collecting chambers in said sleeve and interposed between said delivery openings and said trough in close side by side crossing relation to said trough, said chamber forming means having overflow openings formed in their upper portions and positioned to overflow into said trough at points angularly displaced from said delivery openings in said sleeve, said chamber forming means having walls disposed in transverse spaced relation across the inner ends of said delivery openings to cause an abrupt change to direction of flow of liquid entering through said delivery openings at a level below the level of overflow from the chamber.

9. Gas separating apparatus for wells comprising a tubular pump column having an intake at its lower end, walls forming a delivery passage arranged spirally around the lower end of said column in contact therewith and opening at the lower end of the passage to the lower end of said column, a plurality of annular collecter rings disposed at vertically spaced intervals around said column and said passage and in close side by side crossing relation to the outer wall of said delivery passage, said rings having overflow openings formed in their sides communicating in overflowing relation above their bottoms with said passage, means forming restricted delivery inlets to said rings from the well at angularly spaced positions from the overflow positions from the rings to the passages and below the level of the overflow position of the associated ring, means excluding the entry of liquid from the well into said rings and said passage except at said delivery inlets and means forming a gas outlet from the upper end of said passage.

10. Gas separating apparatus for wells comprising a tubular pump column having an intake at its lower end, walls forming a delivery passage arranged spirally around the lower end of said column and opening at the lower end of the passage to the lower end of said column, a plurality of annular collector rings disposed at vertically spaced intervals around said column and in close side by side crossing relation to one of the walls forming said delivery passage, said rings having overflow openings formed in their sides communicating in overflowing relation above their bottoms with said passage, means forming restricted delivery inlets to said rings from the well at angularly spaced positions from the overflow positions from the rings to the passages, said delivery inlets to said rings being located below the level of the overflow opening of the associated ring, means excluding the entry of liquid from the well into said rings and said passage except at said delivery inlets and means forming a gas outlet from the upper end of said passage.

References Cited in the file of this patent
UNITED STATES PATENTS

| | | |
|---|---|---|
| 2,104,339 | Arutunoff | Jan. 4, 1938 |
| 2,398,339 | Watts | Apr. 9, 1946 |
| 2,800,085 | Hansen | July 23, 1957 |
| 2,843,053 | Carle | July 15, 1958 |